US006411866B1

United States Patent
Cavanagh

(10) Patent No.: US 6,411,866 B1
(45) Date of Patent: Jun. 25, 2002

(54) DIGITAL TRANSMISSION AND CONTROL SYSTEM FOR VEHICLES

(76) Inventor: David P Cavanagh, 33 Laurel St. Apt. #2, Watertown, MA (US) 02471

( * ) Notice: Subject to any disclaimer, the term of this patent is extended or adjusted under 35 U.S.C. 154(b) by 0 days.

(21) Appl. No.: 09/195,474

(22) Filed: Nov. 18, 1998

(51) Int. Cl.$^7$ ................................................ H04R 1/20

(52) U.S. Cl. .............................. 701/1; 701/36; 455/149; 395/280; 395/287

(58) Field of Search ...................... 701/1, 36; 455/149; 395/280, 287

(56) References Cited

U.S. PATENT DOCUMENTS 5,983,087 A * 11/1999 Milne et al. ................ 455/149

* cited by examiner

*Primary Examiner*—William A. Cuchlinski, Jr.
*Assistant Examiner*—Arthur D. Donnelly
(74) *Attorney, Agent, or Firm*—Mark P. White

(57) ABSTRACT

A digital transmission system for replacing complex, many-wire, analog system in transportation and construction vehicles includes a uni-directional or bi-directional signal bus structure and a optional power bus structure. The signal bus structure is composed of uni-directional or bi-directional signal carriers. Uni-directional or bi-directional signal tap lines attach to the signal bus with terminal devices. The signal bus and tap lines terminate in microprocessor devices that generate, prioritize, send, receive, and process signals that are sent through the signal bus and its tap lines. Electro-mechanical, electrical, and electronic devices attach either directly or through converters to the terminating microprocessors. When any terminal device is operated or otherwise generates information, the microprocessor to which the device is attached generates a signal identifying the device and prioritizing and coding the information that is generated. The microprocessor then passes this signal to the signal bus and its tap lines. All microprocessors receive and decode the signal, determine its priority and, process appropriate signals by passing the information in the signal to the correct devices in the proper form. In cases where an appropriate response is to apply or turn off power to given device, signals are sent to the appropriate power controllers attached to the power bus line. A plurality of devices thus communicate and control one another via one signal bus and power bus line rather than by a complex and bulky set of wire harnesses and attachments.

20 Claims, 13 Drawing Sheets

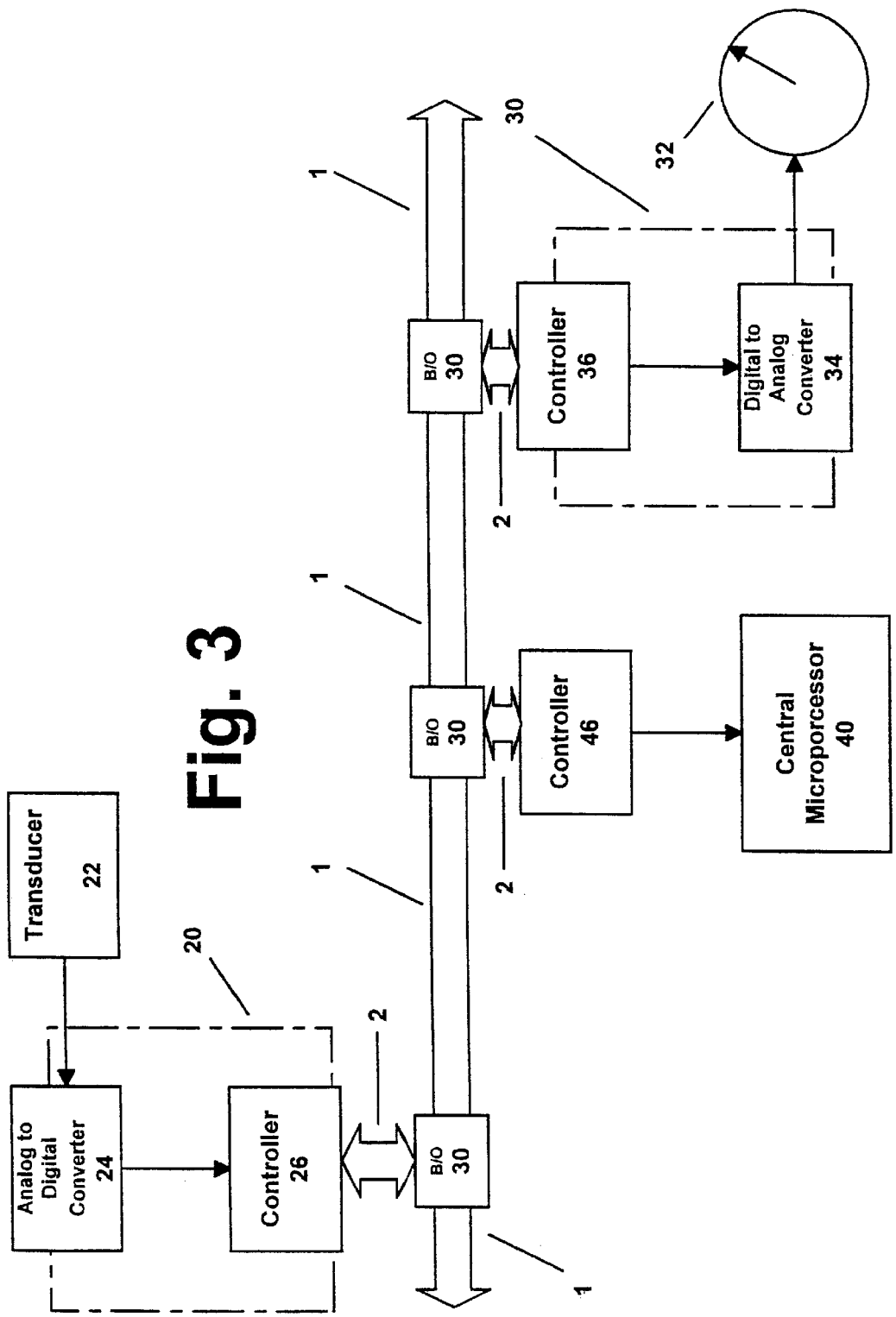

DIGITAL TRANSMISSION AND CONTROL SYSTEM FOR VEHICLES

BACKGROUND—FIELD OF INVENTION

This invention relates to a digital transmission and control system for vehicles, and more specifically such a system which replaces the traditional analog system employing cable harnesses in vehicles such as automobiles, agricultural equipment, and the like.

DESCRIPTION OF PRIOR ART

The traditional analog system employing wire harnesses is an essential design feature in transportation and construction vehicles, agricultural and manufacturing equipment, and other devices where:

(1) electro-mechanical, electric, and/or electronic devices[1] are connected to instrument panels that allow human or computer operators to monitor and control their operation through the generation and transmission of electrical or electronic signals and/or (2) electro-mechanical, electric, and/or electronic devices[2] are connected together into systems in which the devices communicate with and control one another and react to changes in the external environment through the generation and transmission of electrical or electronic signals.

[1] The electro-mechanical, electric, and/or electronic devices referenced in this patent application include: (1) transducers, (2) indicating devices, such as lights and meters, (3) control devices, such as switches, buttons, and levers, (4) electric motors, (5) electrically and/or electronically controlled mechanical devices such as hydraulic systems, and (5) all other such devices as are currently incorporated within systems that utilize wire-harnesses.

Currently these systems employ wire harnesses, typically comprising hundreds of individual conductors, each dedicated to controlling and/or communicating with one of many different devices. Thus, for example, in an automobile, one set of wires in a harness might indicate whether certain lights are operating, another set of wires might indicate the level of illumination the lights are providing (high beam/low beam), and additional sets of wires might provide power for power controllers that turn the lights on or off and/or control the level of the lights. Even in automobiles, the large number of devices that must be monitored and controlled results in complex and bulky wire harnesses comprising dozens of individual wires. In aircraft and other more complex systems, wire harnesses frequently comprise thousands of individual wires.

These complex wire harnesses create many design, engineering, and construction problems. Their geometry and weight must be taken into account when designing the total system of which they are a part. For example, in aircraft design, certain structural members may have to be modified or moved to allow for the installation of bulky wire harnesses comprising hundreds of individual wires. Furthermore, because these harnesses are so large, the harness design must frequently be modified to take account of limitations imposed by the total structure. Wire harnesses must frequently have complex topologies, e.g., splits and branches involving bundles of hundreds of individual wires, because the harnesses must fit within pre-designated places and individual wires in the harness must connect to the appropriate devices.

After the wire harnesses for a particular system have been designed they must be constructed. This involves the design and construction of complex templates and/or armatures. After these templates and/or armatures are built, either workers must be instructed in how to load wires into them and splice appropriate bundles of wire together, or complex machinery must be programmed for the same task. The sheer number of wires involved leaves large latitude for errors to occur. Therefore each harness must be frequently tested, to determine that wires are appropriately bundled and directed within the harness.

During construction, large wire harnesses may weigh enough that they require considerable effort to move. They may also require effort to install into the systems of which they become apart. In extreme instances this may involve ad hoc modifications during the construction process, e.g., the widening of a hole in a structural member. The prior art teaches a plethora of inventions to deal with the problem of wire harness and installation. Typical among these is the patent by Gold, U.S. Pat. No. 5,371,942.

Wire harnesses are also subject to problems during use. Friction between insulated wires in the same harness may abrade insulation. This can lead to the failure of wire harness components. In extreme cases, such problems have resulted in short circuits, electrical fires, and even total system failure.

It may be necessary, on occasion, to alter wire harnesses during the operational lifetime of the systems within which they are incorporated. For example, such alterations might be required for reasons of safety, economy, or improved technology. Changing the configuration of wire harnesses after they have been incorporated into an operating system, e.g., a ship, aircraft, or automobile, is expensive and difficult.

To summarize, the current technology for wire harnesses results in bulky bundles of wires that often have complex topologies. These harnesses create design and engineering constraints. They must be manufactured and incorporated into the systems of which they are a part by using complex and expensive procedures that may be prone to error. Wire harnesses are also subject to wear during use that can result in system failure. It is difficult to change the configuration or operating characteristics of a wire harness after it has been incorporated into the system of which it forms a part.

The wire harness is well adapted to the basically analog system which communicates between transducers, switch closures, and voltage levels as input devices, and analog meters, indicators, and annunciators as outputs. This analog system has been the only economically feasible system available since the development of the vehicles in which they are used. However, the current state of the digital technology now makes it possible to replace the analog system with a digital one.

They key to the use of a digital system is the central computer bus, which replaces the wire harness. The bus make be one of many different types: arrays multi-conductor lines, optical bundles, waveguides are all applicable for this purpose. Furthermore, serial transmission may be used in the main bus, so that a single coaxial cable, or dual twisted pair cables, may form the central spine of this system.

The electrical system may be thought of as the analog of a computer network, in which the remote inputs and outputs form network nodes. The nodes require several devices for their operation: first, there must be a local bus which communicates between the main bus and the node. Next there must be a digital controller, with addressing capability to isolate data intended for the node, and, in the case of serial data transmission, to convert it to parallel data for further processing. A converter is also usually necessary to convert the digital data to analog, and vice versa. And finally, there must be data processing capability, either at the node itself, or via a central microprocessor which collects data from all the inputs, processes the data, and produces outputs accordingly.

Because of continuing miniaturization and increase in computing power of modern microprocessor technology, the cost of the elements required at the node is now sufficiently low to make such a system economically feasible. Installation costs will be reduced, as traditional cables are expensive to fabricate, install, and test. Modularization of the elements will further reduce construction costs. The digital system lends itself to self-testing, reducing maintenance. And the resulting system will have a reduced weight and complexity.

Advantages of the Digital System

This invention will, in many cases, be able to replace an extremely heavy, bulky, and topologically complex analog system with its attendant wire harness comprising hundreds of individual wires with one bi-directional or unidirectional signal bus, an optional power bus and individual tap lines attached to these bus lines by appropriate connectors.

The bi-directional or uni-directional signal bus and tap lines will be composed either of a single wire, cable, optical cable, wave guide, or another type of bi-directional or uni-directional, signal carrying device. Bus and tap lines will terminate in processors that are specially designed and programmed to generate, prioritize, receive, and process either token packets, switched wave packets, or other types of signals used in computer networks. Such microprocessors may be designed and built for each such bus and tap line system or created by programming off-the-shelf hardware.

Depending upon geometry, it may sometimes be necessary to provide local bus line branches, or taps, from the main signal bus. These local bus lines require the use of break-outs, or fan-outs, which allow these branches to the nodes terminating these branches, without degrading the transmission quality of the main bus. Examples of these break-outs for optical signal buses are described in the patents by Caron, U.S. Pat. No. 5,394,502, and Pilatos, U.S. Pat. No. 5,659,655.

Electro-mechanical, electrical, and electronic devices will attach, either directly or through appropriate converters, to the terminating microprocessors. When such a device is operated or otherwise generates information, the microprocessor to which the device is attached will generate a signal identifying the device and prioritizing and coding the information that is generated. The microprocessor will then pass this information to the signal bus and signal tap lines as a token packet, switched wave packet or other type of signal. All microprocessors will receive this signal, decode it, determine its priority and, when appropriate, process the signal and pass it to the appropriate, attached converters, electro-mechanical devices, electrical devices, and/or electronic devices, in an appropriate form. In cases where an appropriate response to a signal will be to apply or turn off power to given devices, signals can be sent to the appropriate power controllers attached to the optional power bus line. Many devices will thus be able communicate with and control one another via one signal bus line and an optional power bus line rather than by a complex and bulky set of wire harnesses and attachments.

This invention will greatly simplify the design, engineering and construction of systems that currently require large, complex wire harnesses. The use of one bus line and associated tap lines will generate great reductions in weight and bulk. Less concern will be needed in designing systems that currently incorporate the placement of complex wire harnesses, since it will be relatively much easier to plan the placement of a single bus line and associated tap lines and microprocessors. The effort currently given to designing the topology of complex wire harnesses, designing templates and/or armatures for their construction, and training workers or programming machines in harness construction procedures will be eliminated.

Although additional effort may be required to program and/or design microprocessors for use as terminators in the single bus system described in this patent application, the effort involved will usually be less than is currently needed to design and construct complex wire harnesses. Construction costs for the single bus system will also be minimal and construction will be less onerous and error prone than is the case with complex wire harnesses.

Redundancy can be an important safety consideration in aircraft and other applications. This invention will also allow for greater redundancy. Many-wired, wire harnesses are bulky, and duplicating them within a given space may be difficult or impossible. The single signal bus and optional power bus composing a large physical part of this invention take(s) up little space. It would, therefore, be relatively easy to incorporate duplicates of these buses into any given system; thus increasing redundancy and safety.

Operational safety will be further enhanced because this invention will reduce the possibility, inherent in many-wired wire harnesses, of friction between wires leading to insulation failure. Such insulation failures can cause wire harness systems to malfunction and, in extreme cases, generate electrical fires. Because this invention will greatly reduce the number of wires required in any system it will reduce the possibility of system failures due to friction between wires.

A further advantage of this invention is that it will allow simplification of control panels by allowing many control panel instruments and readouts to be simplified and/or perform more functions than would be the case with wire harnesses. This is because much of the functionality of control panel instrumentation can be incorporated within the microprocessors and microprocessor programs that are part of the invention.

A simple example will make this clear. Currently on many cars a multi-setting switch controls windshield wiper speed. This switch directly controls the speed of the motor driving the windshield wipers. Such switches are expensive and many wires connect them to the windshield wiper motor.

With the current invention a much simpler, less expensive, and easier to use system could replace the multi-setting switch. A simple push button would send a pulse signal through the signal bus to the appropriate microprocessor. This microprocessor would store the current state of the windshield wiper motor—off, lowest speed, higher speed, highest speed—and, through the appropriate connecting device, ratchet up the speed of the motor every lime the control panel button is pushed. When the button is pushed while the motor is running at its highest speed the microprocessor could be programmed to send a signal that shuts the motor off.

Incorporating wire harness functionality within the microprocessors and microprocessor programs that are part of the invention will also, in many instances, facilitate inexpensive changes to existing systems that are already incorporated in aircraft, automobiles, and other applications. With the current invention such changes may frequently be accomplished by re-programming or replacing the system's microprocessors. Changes to wire harness systems, in contrast, may require extensive rewiring that is usually expensive, time-consuming, and error-prone. Similarly, design changes will be much easier to facilitate with the current invention than is the case with wire harness systems.

Finally, incorporating the functionality of wire harness systems within the microprocessors and microprocessor programs that are part of the invention will allow embodiments of this invention that would either be impossible with standard wire harness systems or would require very complex systems. For example, the microprocessors and their programs can retain a history of activities in the system and determine the processing of future signals based upon this history. Thus, a heat detection and alarm system might be triggered not just when an indicator detects a certain level of heat, but when the first or second derivative of heat increase exceeds a boundary value.

SUMMARY OF THE INVENTION

It is an object of the current invention to provide a digital electronic system to replace the analog system currently used in automobiles and other vehicles. It is a further object of this invention to implement the analog system using a digital signal bus to replace the multi-conductor cable harness used in the prior art.

According to one aspect of the current invention, a transmission and control system for vehicles communicates with a multiplicity of input and output devices. The invention includes a bi-direction digital data bus and a multiplicity of nodes, each connected to the data bus. Each node further includes a converter connected to the input or output device at the node, and a digital processor, electrically connected to the converter and to the bus, communicating data from the bus to the converter.

According to a second aspect of the invention, one or more of the nodes control power devices a power bus, electrically connected to each power control nodes, is also included.

According to a third aspect of the invention, a power tap is included at each power control node, each such power tap connected at one end to the power bus, and connected at the other end to a controller.

According to a fourth aspect of the invention, a central microprocessor electrically connected to the signal bus is included.

According to a fifth aspect of the invention, the controllers are intelligent controllers.

According to a sixth aspect of the invention, a multiplicity of signal break-outs, a signal break out are included, a break-out located at each node, connected at one end to the signal bus, and at the other end to the local bus.

According to a final aspect of the invention, the converters further include one or more members of the group which consists of digital to analog converters, analog to digital converters, relays, transponders, solenoids, and solid state switches.

BRIEF DESCRIPTION OF THE DRAWINGS

These, and further features of the invention, may be better understood with reference to the accompanying specification and drawings depicting the preferred embodiment, in which:

FIG. 2b (purposely left blank)

FIG. 2h depicts propagation of feedback signals to device 7a.

FIG. 2I is an alternative depiction showing propagation of feedback signals to device 7a.

FIG. 3 is an implementation controlling a speedometer from a velocity transducer signal originating in an automobile transmission, utilizing signal bus breakouts.

DESCRIPTION OF THE PREFERRED EMBODIMENTS

Figure 1:
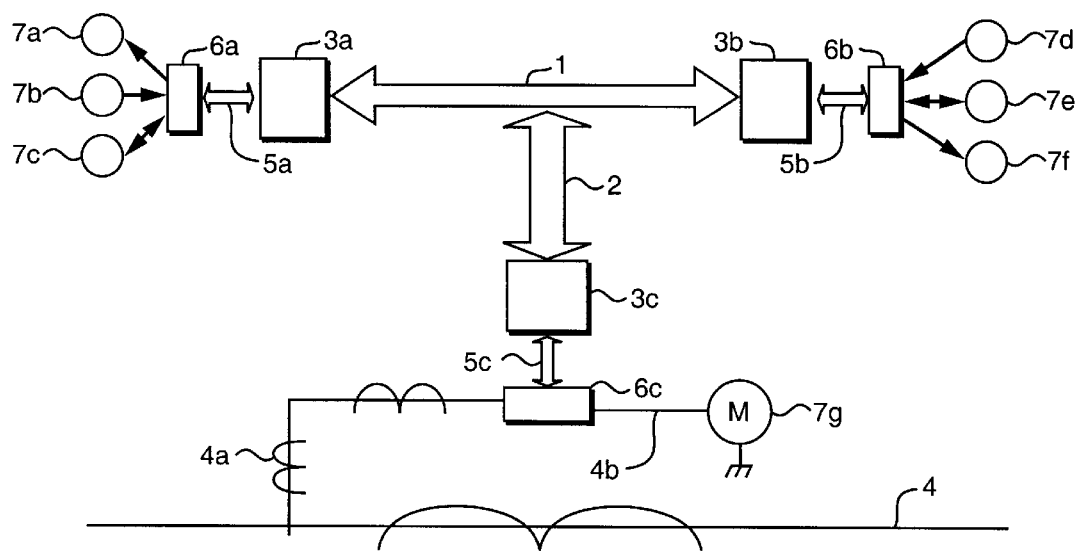
FIG. 1 depicts a block diagram illustrating the first preferred embodiment incorporating a power bus.

The preferred embodiment may be understood by first describing the nature of the data transfers across the elements of the system, and the nature of the data storage at the nodes. The following reference numbers are used in FIGS. 1 through 2i.

| | |
|---|---|
| 1. | Primary bi-directional signal bus |
| 2. | Bi-directional signal tap line |
| 3a. | First terminating microprocessor |
| 3b. | Second terminating microprocessor |
| 3c. | Third terminating microprocessor |
| 4. | Power bus line |
| 4a. | Power line from the power bus line (4) to power controller (6c) |
| 4b. | Power line from the power controller (6c) to the electrical motor (7g) |
| 5a. | Connector from the first microprocessor (3a) to a converter (6a) for transmitting signals between the microprocessor (3a) and the devices (7a, 7b, 7c) attached to it |
| 5b. | Connector from the second microprocessor (3b) to a converter (6b) for transmitting signals between the microprocessor (3b) and the devices (7d, 7e, 7f) attached to it |
| 5c. | Connector from the third microprocessor (3c) to a power controller (6c) controlling whether a current passes from the power tap line (4a) through the line (4b) and the electric motor (7f) to ground, thus powering the motor (7f) |
| 6a. | A converter for converting and transmitting signals between the first microprocessor (3a) and the devices (7a, 7b, 7c) attached to it |
| 6b. | A converter for converting and transmitting signals between the second microprocessor (3b) and the devices (7d, 7e, 7f) attached to it |
| 6c. | A power controller |
| 7a. | A device receiving signals from the first microprocessor |
| 7b. | A device sending signals to the first microprocessor |
| 7c. | A device capable of sending signals to and receiving signals from the first microprocessor |
| 7d. | A device sending signals to the second microprocessor |
| 7e. | A device capable of sending signals to and receiving signals from the second microprocessor |
| 7f. | A device receiving signals from the second microprocessor |
| 7g. | An electrical motor |
| 8a. | The initial internal state of the first microprocessor [Sa(0)] |
| 8b. | The initial internal state of the second microprocessor [Sb(0)] |
| 8c. | The initial internal state of the third microprocessor [Sc(0)] |
| 9a. | An action-denoted by an asterisk, *-causing a change in the state of the device (7b) |

-continued

| | |
|---|---|
| 9b. | The signal generated by device (7b) and propagated to converter (6a) as a result of action (9a) |
| 9c. | The internal activity-denoted by an asterisk, *-produced in the converter (6a) as a result of the signal (9b) generated by device (7b) |
| 9d. | The signal generated by converter (6a) as a result of its internal activity (9c) |
| 9e. | The internal activity-denoted by an asterisk, *-in the first microprocessor (3a) upon receiving the signal (9d) |
| 9f. | Sa(1): the new internal state of the first microprocessor (3a) as a result of the internal activity (9e) |
| 9g. | The electronic signal sent to the bi-directional serial bus (1) by microprocessor (3a) as a result of the internal activity (9e) and the change from internal state Sa(0) (to Sa(1) (9f) |
| 9h. | Propagation of the signal (9g) down the bi-directional serial bus (1) to the terminating microprocessor (3b) |
| 9i. | Propagation of the signal (9g) down the bi-directional serial tap line (2) to the terminating microprocessor (3c) |
| 9j. | The internal activity-denoted by an asterisk, *-in the microprocessor (3b) upon receiving the signal (9h) |
| 9k. | Sb(1): the new internal state of the microprocessor (3b) as a result of the internal activity (9j) |
| 9l. | The internal activity-denoted by an asterisk, *-in the microprocessor (3c) upon receiving the signal (9i) |
| 9m. | Sc(1): the new internal state of the microprocessor (3c) as a result of the internal activity (9l) |
| 9n. | The electronic signal, resulting from the internal activity (9j) and change of internal state from Sb(0) to Sb(1) (9k) in microprocessor (3b), and sent from microprocessor (3b) via the connector (5b) to the converter (6b) |
| 9o. | Internal activity-denoted by an asterisk, *-taking place in the converter (6b) as a result of receiving signal (9n) |
| 9p. | Signal sent to device (7e) by converter (6b) as a result of internal activity (11b) in the converter |
| 9q. | Activity-denoted by an asterisk, *-induced in device (7e) as a result of receiving signal (9p) |
| 9r. | Signal sent to device (7f) by converter (6b) as a result of internal activity (11b) in the converter |
| 9s. | Activity-denoted by an asterisk, *-induced in device (7f) as a result of receiving signal (9p) |
| 9t. | Signal sent to power controller (6c) as a result of internal activity (9l)-denoted by an asterisk, *-and change of internal state from Sc(0) to Sc(1) (9m) in microprocessor (3c) |
| 10a. | Action(s)-denoted by a double asterisk, **-in device (7e) subsequent to receiving and acting upon the signal (9p) |
| 10b. | Signal produced and sent to converter (6b) by device (7e) as a result of the action(s) (10a) in this device |
| 10c. | Action(s)-denoted by a double asterisk, **-in converter (6b) as a result of receiving and processing signal (10b) |
| 10d. | Signal produced by converter (6b) and sent to microprocessor (3b) as a result of action(s) (10c) by the converter |
| 10e. | New state of microprocessor (3b)-state Sb(2) replaces Sb(1)-as a result of receiving signal (10d) from converter (6b) |
| 10f. | Action(s)-denoted by a double asterisk, **-occurring in microprocessor (3b) as a result of receiving signal (10d) from converter (6b) |
| 10g. | Signal produced and sent to the signal bus (1) by microprocessor (3b) as a result of the new state Sb(2) (10e) of this microprocessor and the microprocessor action(s) (10f) in this device |
| 10h. | New state induced in microprocessor (3a) as a result of receiving and processing signal (13g) from the signal bus (1) |
| 10i. | Action(s)-denoted by a double asterisk, **-induced in microprocessor (3a) as a result of receiving and processing signal (10g) from the signal bus (1) |
| 10j. | Signal produced and sent to the converter (6a) via the connector (5a) by microprocessor (3a) as a result of the new state Sa(2) (10h) of this microprocessor and the microprocessor action(s) (10i) |
| 10k. | Action(s)-denoted by a double asterisk, **-induced in the converter (6a) as a result of receiving and processing signal (10j) from the microprocessor (3a) via the connector (5a) |
| 10l. | Signal created by the converter (6a) as a result of internal actions (10k) and propagated to device (7a) |
| 10m. | Action(s)-denoted by a double asterisk, **-induced in the device (7a) as a result of receiving signal (10l) from the converter (6a) |

Structural Description—FIG. 1

A simplified, general embodiment of the present invention is presented in FIG. 1. A bi-directional signal bus (1), composed of any type of bi-directional signal carrier, e.g., a wire, twisted wire pair, cable, optical cable, or wave guide, comprises the primary structure. Each end of the signal bus attaches to a microprocessor (3a, 3b). Bi-directional signal tap line(s) (2), composed of the same type of signal carrier as the primary signal bus, may be attached to the primary bi-directional signal bus with appropriate connectors. Each such signal tap line also attaches to a microprocessor (3c). Because some or all of the terminating microprocessors contained in particular embodiments of this invention may differ from one another in design or programming, depending on the functionality of particular embodiments, each microprocessor in FIG. 1 is identified uniquely.

The terminating microprocessors (3a, 3b, 3c) attach to electro-mechanical, electrical, and electronic devices (7a, 7b, 7c, 7d, 7e, 7f, 7g). Such attachments can be either direct or through short wires, cables, or other appropriate conductors (5a, 5b, 5c), connected to appropriate converters (6a, 6b, 6c). Signal flow between electro-mechanical, electrical, and electronic devices and the hardware to which the devices attach can be uni-directional to the device, uni-directional from the device, or bi-directional. Thus, in FIG. 1, devices 7a and 7e exemplify devices that can only receive signals from the signal bus system. Devices 7b and 7d exemplify devices that can only send signals to the bus system. Finally, devices 7c, 7f, and 7g exemplify devices that can both send information to and receive information from the bus system. Some terminating microprocessors may act directly as switching elements for power controllers that determine whether power from the optional power bus line will reach a particular device or set of devices. Thus, in FIG. 1, power from the power bus line (4), through the power tap lines (4a, 4b), to the device 7g is controlled by a power controller (6e), which in turn is controlled by a connection (5c) to the terminating microprocessor (3c).

Functional Description—FIGS. 2A Through 2I

Figure 2A:
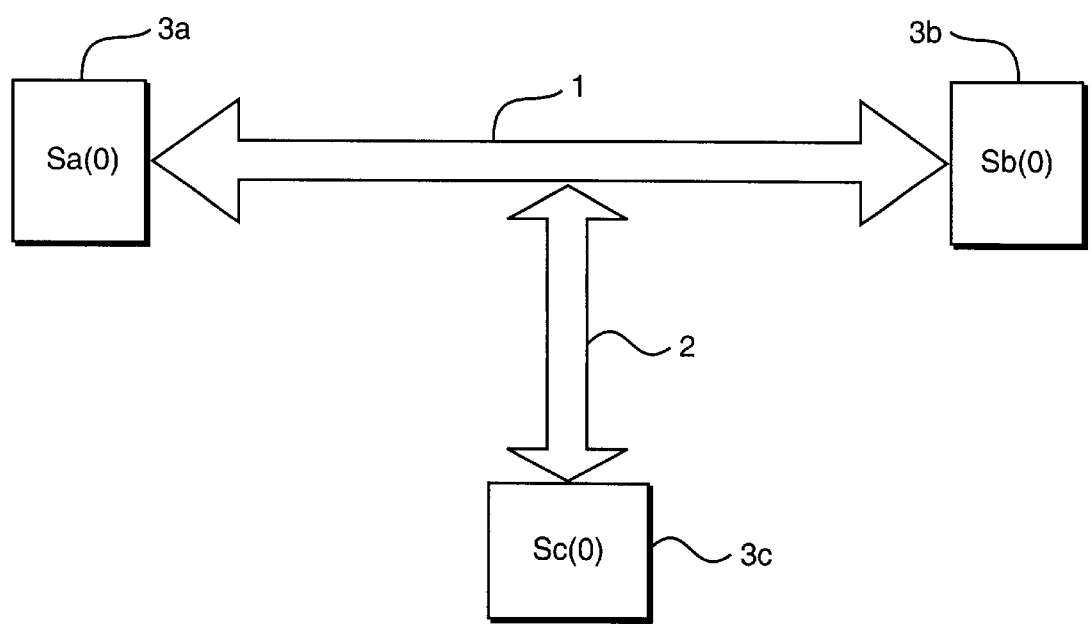
FIG. 2a depicts the initial state of the three microprocessors of FIG. 1.

FIGS. 2a through 2i provide a functional description of the invention's embodiment depicted in FIG. 1. FIG. 2a depicts the central components of the embodiment: the primary bi-directional signal bus line (1), the bi-directional signal tap line (2), and the three terminating microprocessors (3a, 3b, 3c). Initially, each of the three microprocessors have initial internal states—denoted Sa(0), Sb(0), and Sc(0)—and no signals are flowing through either the signal bus line or its tap lines.

This situation changes as soon as any one or more of the attached devices (7a, 7b, 7c, 7d, 7e, 7f) is subjected to an external or internal change—for example, a button might be pressed or a thermocouple subjected to a temperature change. FIG. 2b is a detailed depiction of such a device (7b) and its attachment to a terminating microprocessor (3a), just before such an occurrence.

Figure 2C:
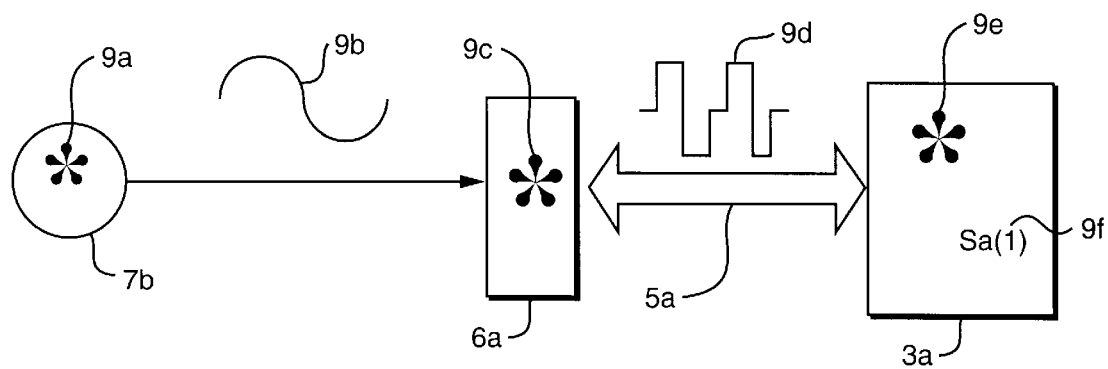
FIG. 2c depicts an external device transmitting data to the first terminating microprocessor of FIG. 1.

FIG. 2c depicts what happens immediately after the device (7b) is subjected to such a change—denoted by the asterisk (*, 9a). The device (7b) produces a signal (9b). If this signal is of the appropriate form, it can be passed directly to the terminating microprocessor (3a). Otherwise, as in this embodiment, the signal (9b) can be processed by a converter (6a), which through internal operations—denoted by the asterisk, * (9c)—generates a signal (9d) that serves as appropriate input to the microprocessor (3a). When this signal reaches the terminating microprocessor (3a), through the connector (5a), the microprocessor performs internal operations—denoted by the asterisk,* (9e)—and changes its internal state from Sa(0)—8 in FIG. 2b—to Sa(1) (9f). [Note: it is possible that Sa(1)=Sa(0).]

Figure 2D:
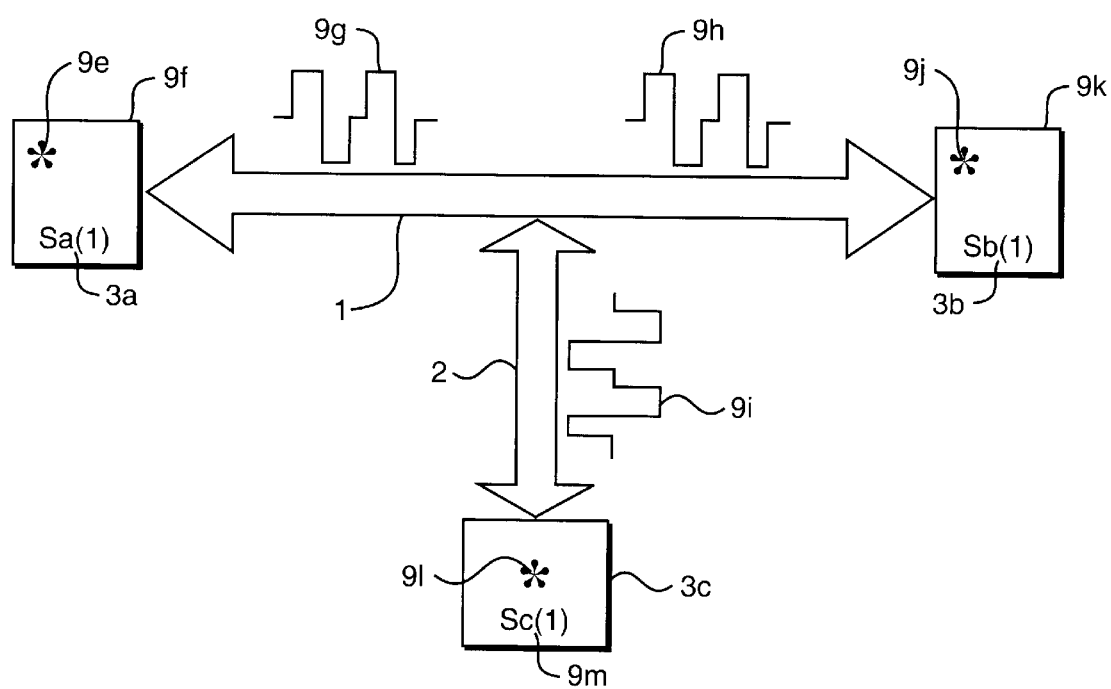
FIG. 2d depicts propagation of the signal down the signal buses of FIG. 1.

FIG. 2d illustrates how, as a result of its internal operations and changed internal state—denoted by the asterisk,*

(10d) and Sa(1),(9f), respectively—the terminating microprocessor (3a) produces a signal (9g), which is propagated (9h) down the primary signal bus (1) to the primary signaling bus's terminating microprocessor (3b). This signal (9i) is also propagated down any signal tap bus(es) (2) to the their terminating microprocessor(s) (3c). When the signal (9h) reaches terminating processor (3b), it causes internal operation—denoted by the asterisk,* (9j)—to be performed and results in a change of the internal state of the microprocessor from Sb(0) to Sb(1) (9k). Depending on the configuration of the microprocessor, it may be that no internal operations are performed and/or Sb(1)=Sb(0). Likewise, when the signal (9i) reaches terminating processor (3c), it causes internal operations—denoted by the asterisk,* (9l)—to be performed and results in a change of the internal state of the microprocessor from Sc(0) to Sc(1) (9m). Again, depending on the configuration of this microprocessor, it may be that no internal operations are performed and/or Sc(1)=Sc(0).

Figure 2E:
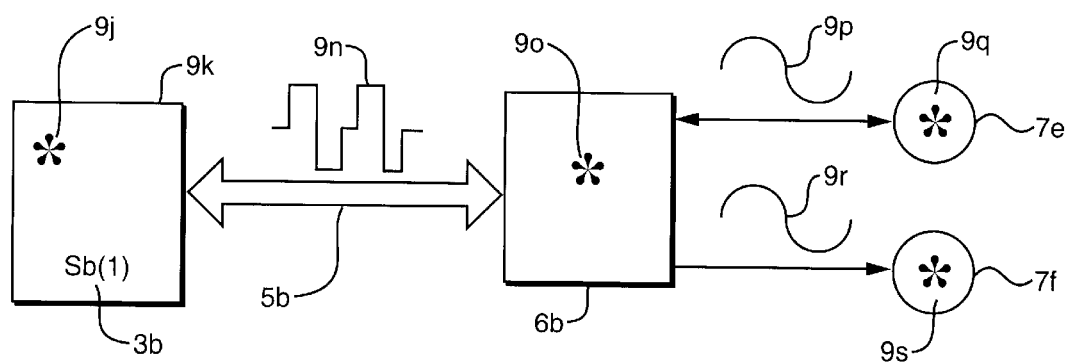
FIG. 2e depicts the propagation of signals to the external output devices 9q and 9s.

FIG. 2e illustrates how, as a result of the internal operations and changed internal state of the terminating microprocessor (3b)—denoted by the asterisk,* (10d) and Sb(1) (10e), respectively—this microprocessor generates a signal (9n) which is propagated on a connector (5b) to a converter (6b). The signal (9n) generates internal activity in the converter—denoted by the asterisk, * (9o). As a result of this internal activity, the converter (6b) generates signals (9p and 9r) which generate appropriate activities (9q and 9s) in the two devices 7e and 7f, respectively.

Figure 2F:
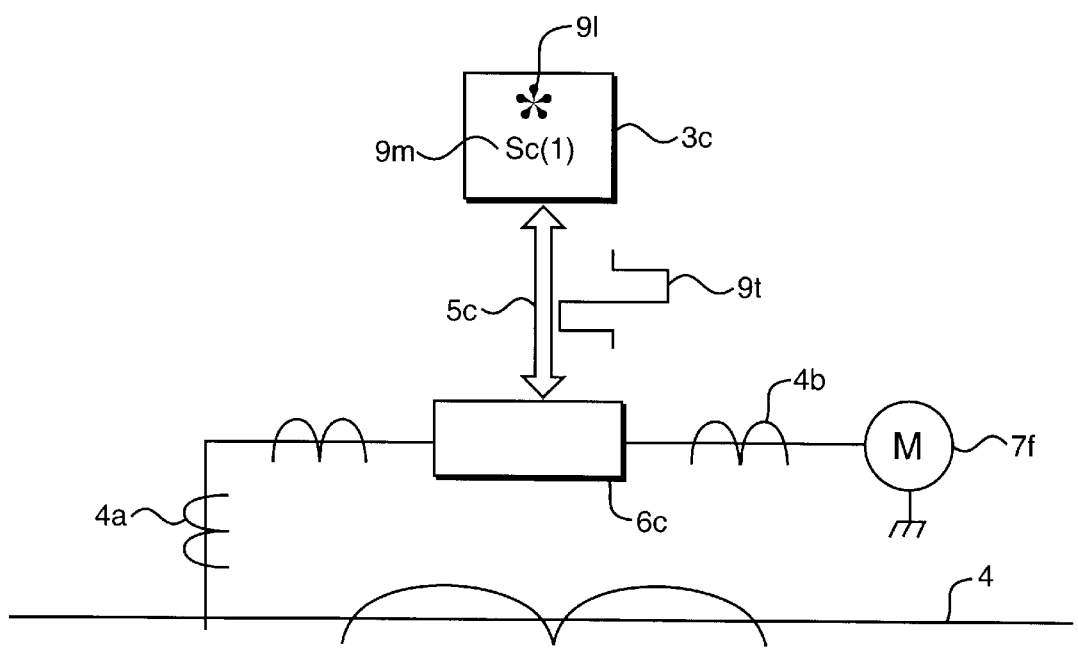
FIG. 2f depicts the propagation of signals to the power controller activating device 7F.

FIG. 2f illustrates how, as a result of the internal operations and changed internal state of the terminating microprocessor (3c)—denoted by the asterisk,* (9l) and Sc(1) (9m), respectively-this microprocessor generates a signal (9t) which is propagated on a connector (5c) to the power controller (6c). This signal causes the power controller (6c) to open the power line (4b) to an electric motor (7f), allowing a current to flow through a power line (4b) and the motor (7f) to ground. This current starts and drives the motor (7f).

Figure 2G:
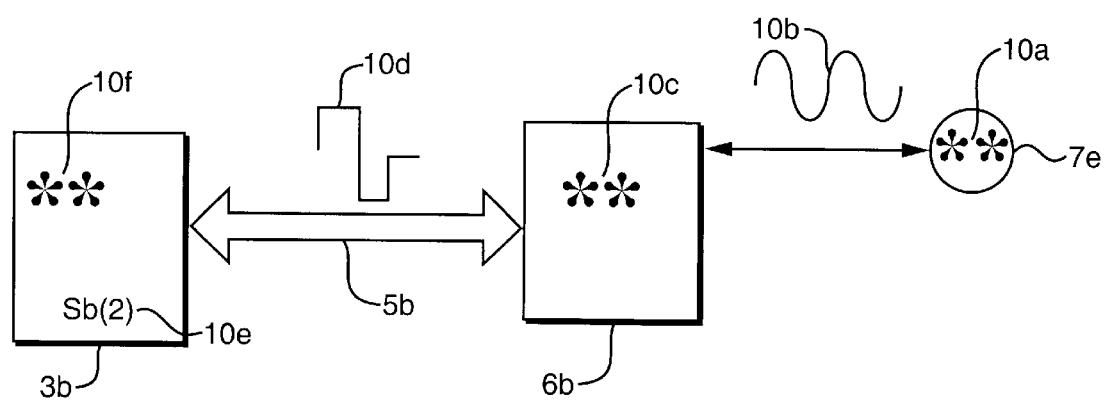
FIG. 2g depicts feedback from output device 7e to the signal bus.
Figure 2H:
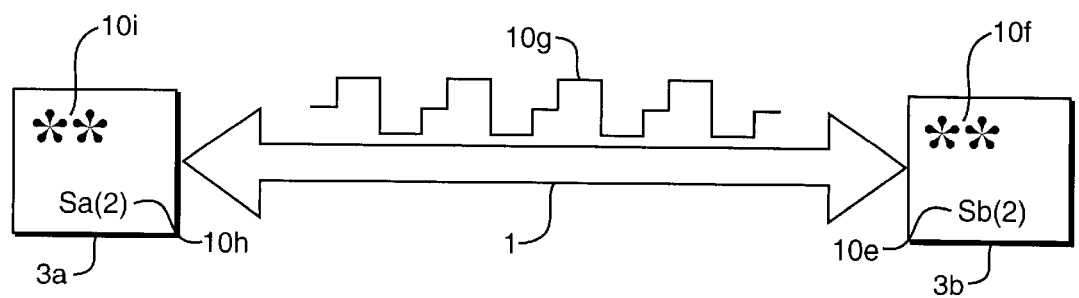
Figure 2I:
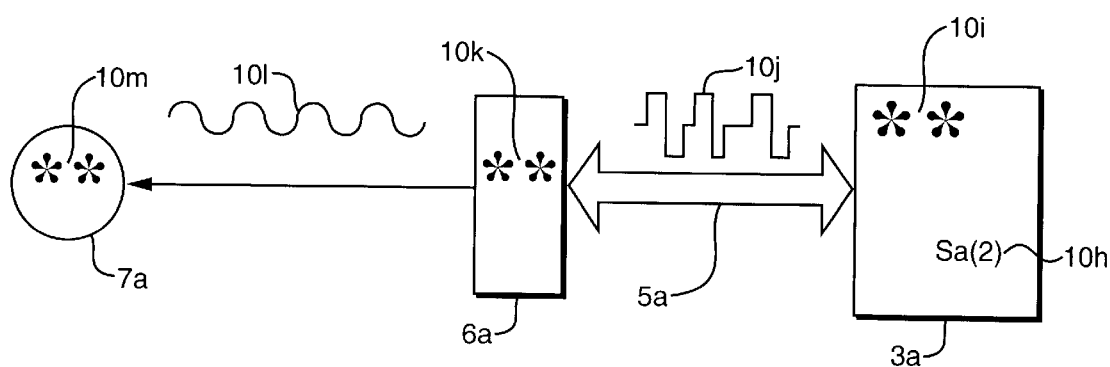

FIGS. 2g through 2i provide an instance of how one action upon one device in the proposed construction can result in actions by multiple devices. The action (9a) in the device (7b) in FIG. 2c produced, as one of its results, the action (9q) in the device (7e) in FIG. 2e. As a direct result of this the action (9q) produces a second action in the device (7e). In FIG. 2g, this action (10a) is denoted by a double asterisk, **. For example, pressing a control panel button might signal a monitoring device to measure a temperature and then transmit the encoded measurement back to the control panel.

In FIG. 2g, ss a result of the activity (10a), the device (7e) transmits a signal (10b) to the converter (6b). The signal (10b) causes activity in the converter (6b)—denoted by the double asterisks, (10c). As a result of this activity, the converter (6b) generates a signal (10d) which propagates along the connector (5b) to the terminating microprocessor (3b). This signal generates internal operations and changed internal state of the terminating microprocessor (3b)—denoted by the double asterisk, (10f) and Sb(2) (10e), respectively.

FIG. 2h illustrates how the changed internal state (10f) and internal operations (10e) in this microprocessor (3b) generate a signal (10g) which propagates down the signal bus line (1) to the terminating microprocessor (3a). As a result, the internal state of this microprocessor becomes Sa(2) (10h) and the microprocessor performs certain internal operation—denoted by the double asterisk,** (10i).

In FIG. 2h, as a result of its changed internal state (10h) and internal operations (10i), the microprocessor (3a) generates a signal (10j), which is propagated down the connector (5a) to the converter (6a). The converter (6a), through internal operations (10k)—denoted by a double asterisk, —generates the signal (10l) and sends this signal to the device (7a). As a result, the device (7a) performs operation (10m), denoted by a double asterisk, .

Modular System Model with Central Microprocessor

The system including a central microprocessor may be understood by referring to FIG. 3. The system depicts a single input node 20, and a single output node 30 for an implementation in an automobile. The input node collects the data from the transducer 22 which generates speed information in the form of an analog signal, generally originating at the car's transmission. The output is a speedometer 32 in the form of a circular gauge, with a galvanometer movement moving a needle in response to the current running through the input coil. In FIG. 3 the input is the transducer for the central bus 1 is understood to extend to a multiplicity of nodes similar to the two depicted in FIG. 3.

Still referring to FIG. 3, he input node 20 further includes an analog-to-digital converter 24 which feeds a digital signal to local controller 26. The local controller performs a number of functions. These include formation of a data packet including the data received from the transducer, and also including a unique address identifying the input node.

The data from the controller is communicated to the local bus 2 through a break-out, or bus tap module 30, which is a plug-able unit allowing easy extension of the bus to its branches.

Several other break-outs are shown in FIG. 3, terminating in other nodes which are not shown in this figure. The central microprocessor, 40, also appears in FIG. 3, connected through a local bus 2, with optional controller 46 performing addressing and serial to parallel and parallel to serial processing. As an alternative, the microprocessor may perform these functions internally, and not require a separate controller.

Referring once more to FIG. 3, the output node communicates with the main bus through break-out 30, and local bus 2, receiving the digital signal through controller 46. This controller, like the controller at the input node, performs a number of functions, which may include resolution of the data packets received into parallel form, generation of address information, and gating of information received in accordance with the address contained.

Any number of different addressing schemes may be used, including IBM's Token Ring™ method.

Figure 4:
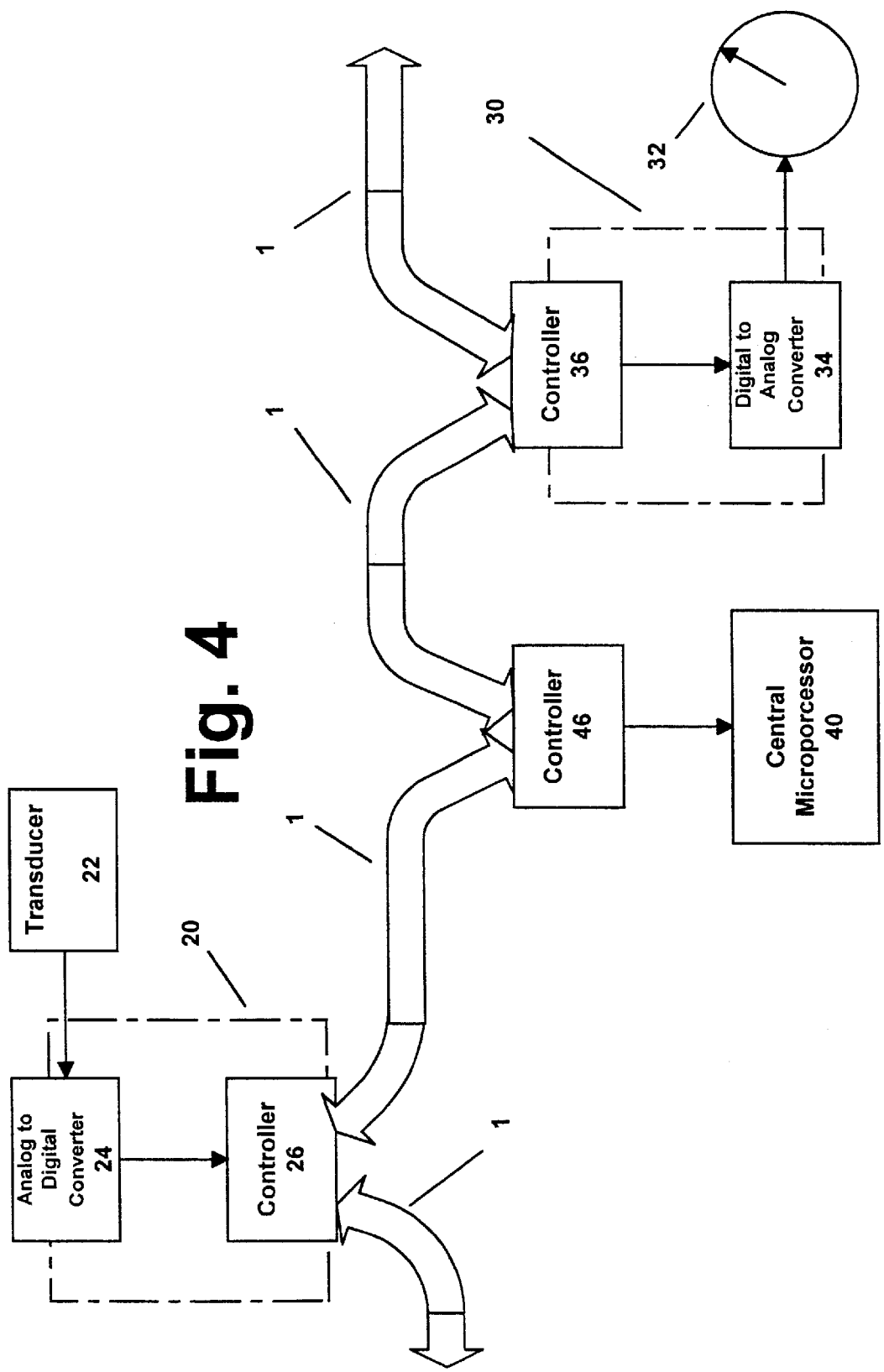
FIG. 4 depicts the implementation of FIG. 3, in which the signal cable is daisy chained in place of signal break-outs.

FIG. 4 depicts an alternative embodiment to that of FIG. 3. Referring now to FIG. 4, the break-out and local bus elements of each node are replaced by daisy-chaining the main bus from node to node. Thus, in FIG. 4 the main bus 1 enters the controller 26 of the input node 20 and exits from the controller 26, proceeding to microprocessor controller 46, and exiting again, proceeding next to controller 36 of node 30.

It should be apparent that this digital system lends itself to the use of digital transducers, thus eliminating the need for analog to digital modules 24, and to the use of digital displays, eliminating the need for analog-to digital converters 34.

Even when analog input and output devices are used, however, the use of modular A/D and D/A converters will minimize the cost of the system, which lends itself to modularization. The controllers may be single chips located on the converters, which themselves may be small, single boards mounted directly on the input or output device.

The use of the central processor will also facilitate new output functions generated from combining the system inputs. Such combinations are already done in automobile computers, as, for instance, in the use of the car's velocity in calculating control functions used by the cruise control. However, it should be clear how the availability of virtually all of the automobiles sensory inputs can be used to provide new, important read-outs to the operator of the vehicle.

Modular System Model with Intelligent Nodes

Figure 5:
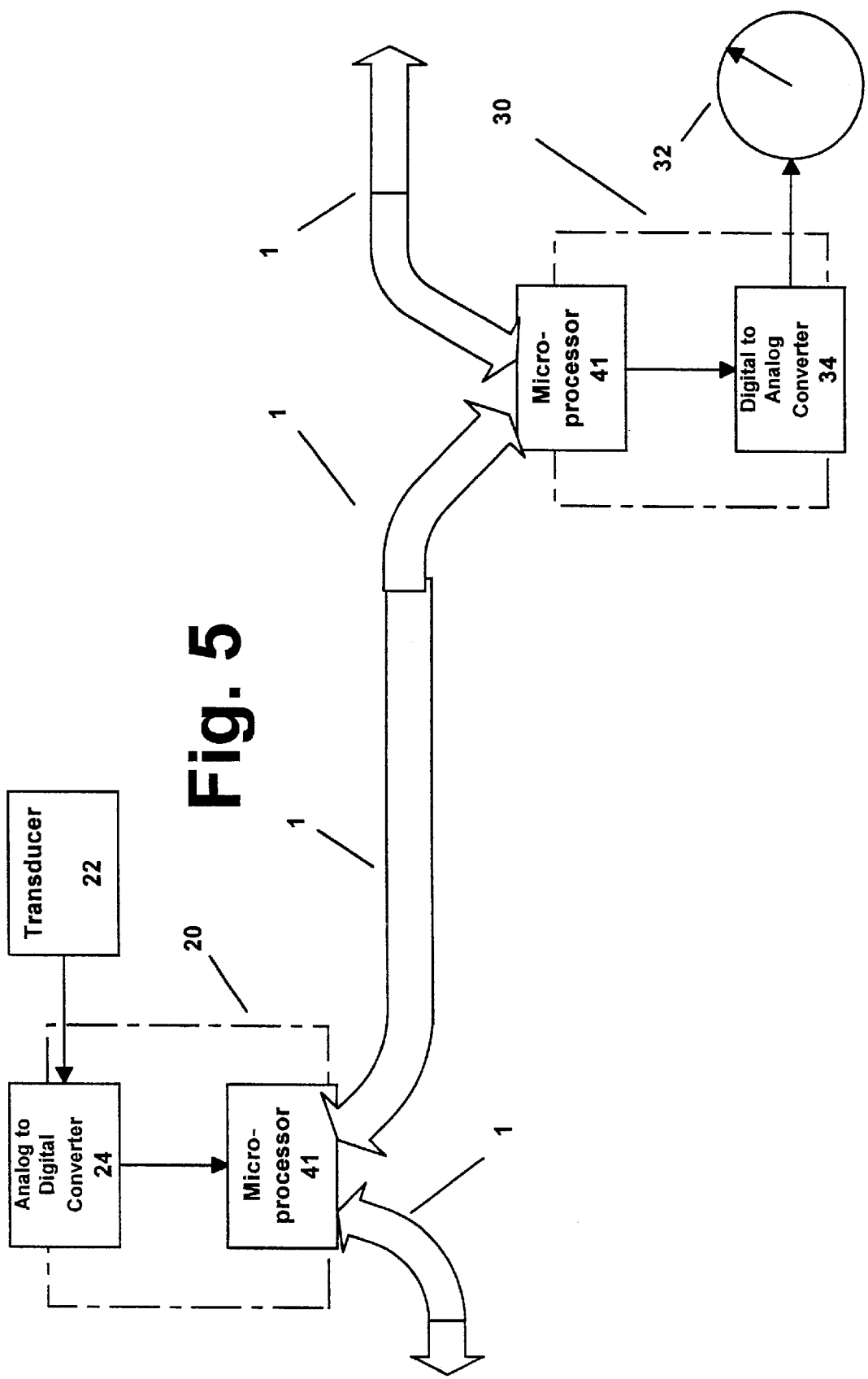
FIG. 5 depicts the implementation of FIG. 4, without a central microprocessor, and with intelligent processors replacing dumb controllers at the nodes.
Figure 6:
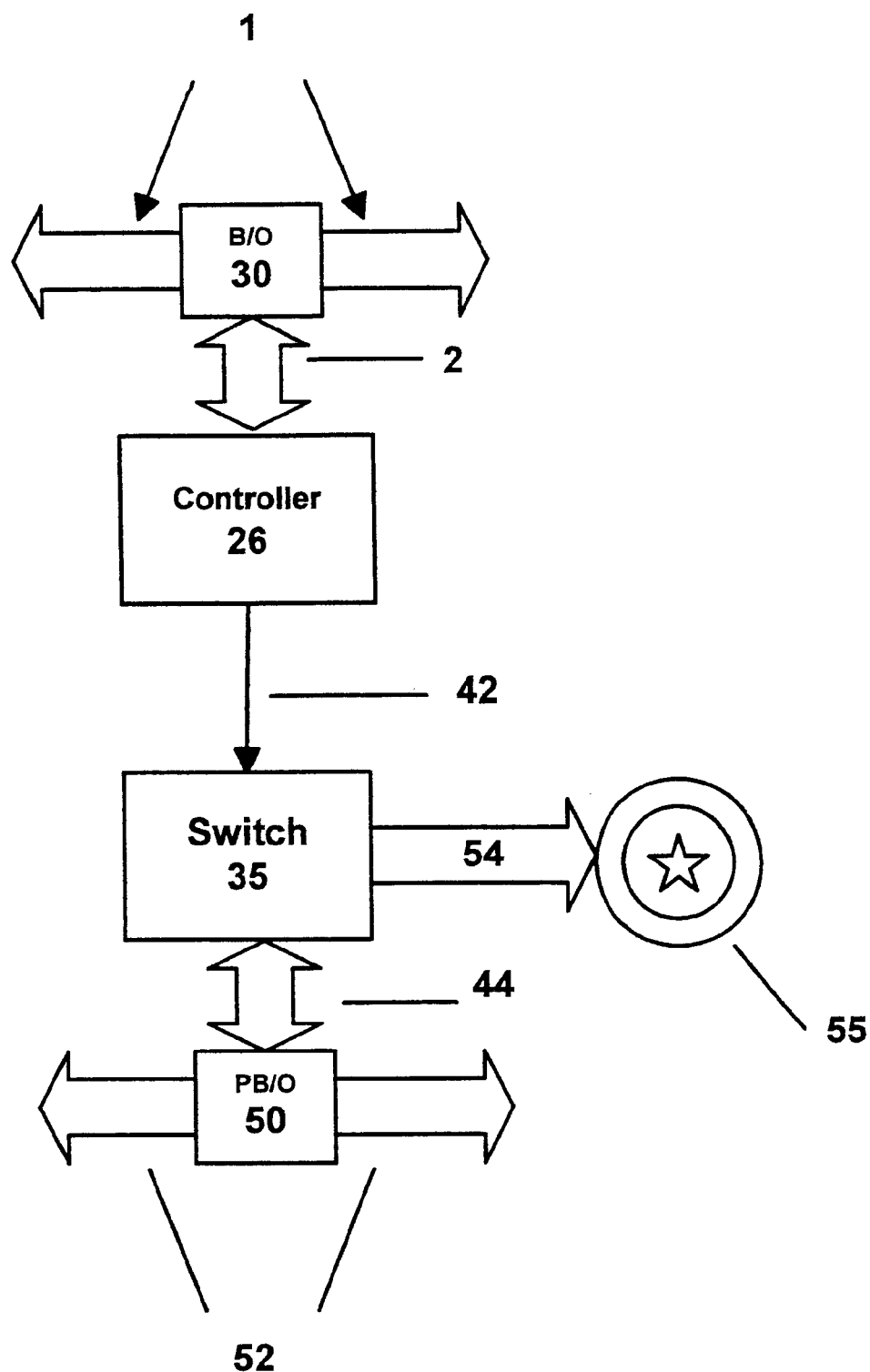
FIG. 6 depicts an implementation of an automobile headlight control output, utilizing a power switch.

An alternative embodiment, as depicted in FIG. 5, utilizes intelligent controllers in place of the controllers of the implementation shown in FIG. 4. A central microprocessor is not provided, but,are replaced by the distributed processing of a multi-processor composed of smaller processors located at the nodes themselves. It should be noted that the difference between this implementation and that depicted by FIG. 4 is generally the absence of a central microprocessor, since the controllers in both embodiments will be microelectronic arrays of logic elements, with extensive calculation capacities. Thus, the difference between a "dumb" controller and an intelligent controller is not at all clear cut, but rather one of degree.

Implementations for Power Switch Node

The nature of the controllers and converters required is dependent upon the nature of the node itself. Thus, when the output desired is the supplying of power to a device, such as headlights, the output converter must be in the nature of a relay, or solid state switch, commanded by a bi-stable signal from the controller. Referring now to FIG. 5, it is seen that the main bus 1 is tapped by break-out 30, which provides a local bus line 2 to the controller 26. The controller in this case decodes the address transmitted along the bus, and detects and routes the control signal intended for this node. The controller transmits a control signal 42 to the switch 35 when so commanded. This switch may be an electromechanical type (relay, e.g.) or solid state type.

The power bus 52 routs power through a local power bus 44 to the switch 35 by means of the power break-out 50. In the example shown in FIG. 5, power is routed to the headlamp 56, causing it to illuminate upon command.

Like the bus break-outs, the power break-outs, or taps, are intended to be modules mass-produced to reduce costs. The power switch modules likewise are applicable to a wide variety of devices requiring substantial current, in contrast to the logic-level signals required by the logic elements.

It will be apparent that improvements and modifications may be made within the purview of the invention without departing from the scope of the invention defined in the appended claims.

I claim:

1. A system for the transmission and distribution of substantially all the electrical signals throughout a vehicle, said system communicating with a multiplicity of input devices and a multiplicity of output devices, and comprising:

a computer network, further comprising a central, serial, bi-direction digital data bus, through which substantially all of the electrical signals of the vehicle pass in the form of a multiplicity of network signals;

a multiplicity of network input nodes, each connected to the digital data bus, each input node further comprising:

a multiplicity of input converters, one connected to each input device, each input converter converting a control signal from the corresponding input device into the network signals; and a multiplicity of network output nodes, each connected to the digital data bus, each output node further comprising:

a multiplicity of output converters, one connected to each output device, each output converter converting the network signals into control signals which drive the corresponding output device.

2. The system of claim 1, wherein:

the input converters and output converters further comprise digital controllers, multi-state controllers and analog controllers;

each state controller further comprises means to store one or more states; and each analog controller comprises means to store one or more values.

3. The system of claim 2, wherein the input and output devices further comprise members of the group which consists of switches, meters, gauges, read-outs, controls, and indicators lights.

4. The system of claim 3, wherein the digital data bus further comprises a member of the group which consists of:

wave guide fiber optics cable; and a plurality of conductors.

5. The system of claim 4, further comprising means to perform diagnostic testing on the system.

6. A system for the transmission and distribution of substantially all the electrical signals throughout a vehicle, said system communicating with a multiplicity of input devices and a multiplicity of output devices, and comprising:

a computer network, further comprising a central, serial, bi-direction digital data bus, through which substantially all of the electrical signals of the vehicle pass in the form of a multiplicity of network signals;

a multiplicity of network input nodes, each connected to the digital data bus, each input node further comprising:

a multiplicity of input converters, one connected to each input device;

a multiplicity of digital input controllers, one electrically connected to each input converter and to the digital data bus, a multiplicity of network output nodes, each connected to the digital data bus, each output node further comprising:

a multiplicity of output converters, one connected to each output device, and a multiplicity of digital output controllers, one electrically connected to each output converter and to the digital data bus.

7. The system of claim 6, wherein:

the input converters and output converters further comprise digital converters, multi-state converters and analog converters;

each state converter further comprises means to store one or more states; and each analog converter comprises means to store one or more values.

8. The system of claim 7, wherein the input and output devices further comprise members of the group which consists of switches, meters, gauges, read-outs, controls, and indicators lights.

9. The system of claim 8, wherein the digital data bus further comprises a member of the group which consists of:

wave guide fiber optics cable; and a plurality of conductors.

10. The system of claim 9, further comprising means to perform diagnostic testing on the system.

11. A method for the transmission and distribution of substantially all the electrical signals throughout a vehicle, said method communicating with a multiplicity of input devices and a multiplicity of output devices, the method comprising the following steps:

incorporating a computer network, further comprising a central, serial, bi-direction digital data bus, through which substantially all of the electrical signals of the vehicle pass in the form of a multiplicity of network signals;

including a multiplicity of network input nodes, each connected to the digital data bus, each input node further comprising:

a multiplicity of input converters, one connected to each input device, each input converter converting a control signal from the corresponding input device into the network signals; and including a multiplicity of network output nodes, each connected to the digital data bus, each output node further comprising:

a multiplicity of output converters, one connected to each output device, each output converter converting the network signals into control signals which drive the corresponding output device.

12. The method of claim 11, wherein:

the input converters and output converters further comprise digital controllers, multi-state controllers and analog controllers, and further comprising:

storing one or more states in each state controller; and storing one or more values in each analog controller.

13. The method of claim 12, wherein the input and output devices further comprise members of the group which consists of switches, meters, gauges, read-outs, controls, and indicators lights.

14. The method of claim 13, wherein the digital data bus further comprises a member of the group which consists of:

wave guide fiber optics cable; and a plurality of conductors.

15. The method of claim 14, further comprising performing diagnostic testing.

16. A method for the transmission and distribution of substantially all the electrical signals throughout a vehicle, said method including the communicating with a multiplicity of input devices and a multiplicity of output devices, and comprising:

incorporating a computer network, further comprising a central, serial, bi-direction digital data bus, through which substantially all of the electrical signals of the vehicle pass in the form of a multiplicity of network signals;

including a multiplicity of network input nodes, each connected to the digital data bus, each input node further comprising:

a multiplicity of input converters, one connected to each input device;

a multiplicity of digital input controllers, one electrically connected to each input converter and to the digital data bus, including a multiplicity of network output nodes, each connected to the digital data bus, each output node further comprising:

a multiplicity of output converters, one connected to each output device, and a multiplicity of digital output controllers, one electrically connected to each output converter and to the digital data bus.

17. The method of claim 16, wherein:

the input converters and output converters further comprise digital converters, multi-state converters and analog converters, and each state converter further comprises storing one or more states; and each analog converter further comprises storing one or more values.

18. The method of claim 17, wherein the input and output devices further comprise members of the group which consists of switches, meters, gauges, read-outs, controls, and indicators lights.

19. The method of claim 18, wherein the digital data bus further comprises a member of the group which consists of:

wave guide fiber optics cable; and a plurality of conductors.

20. The method of claim 19, further comprising performing diagnostic testing on the network.

* * * * *